United States Patent
Cardon-Dubois

(10) Patent No.: US 9,266,222 B2
(45) Date of Patent: Feb. 23, 2016

(54) CLAMPING/RELEASING FLANGE

(75) Inventor: Damien Cardon-Dubois, Lavau (FR)

(73) Assignee: Norelem SAS, Fontaine les Gres (FR)

( * ) Notice: Subject to any disclaimer, the term of this patent is extended or adjusted under 35 U.S.C. 154(b) by 401 days.

(21) Appl. No.: 13/990,960

(22) PCT Filed: Nov. 29, 2011

(86) PCT No.: PCT/FR2011/000624
§ 371 (c)(1),
(2), (4) Date: Aug. 6, 2013

(87) PCT Pub. No.: WO2012/076767
PCT Pub. Date: Jun. 14, 2012

(65) Prior Publication Data
US 2013/0307205 A1 Nov. 21, 2013

(30) Foreign Application Priority Data

Dec. 7, 2010 (FR) ..................................... 10 04768

(51) Int. Cl.
| | | |
|---|---|---|
| B25B 1/06 | (2006.01) | |
| B25B 5/08 | (2006.01) | |
| B25B 1/08 | (2006.01) | |
| B25B 1/24 | (2006.01) | |
| B25B 5/16 | (2006.01) | |
| B23Q 3/06 | (2006.01) | |

(52) U.S. Cl.
CPC ... B25B 5/08 (2013.01); B23Q 3/06 (2013.01); B25B 1/08 (2013.01); B25B 1/2405 (2013.01); B25B 5/16 (2013.01); B25B 5/163 (2013.01)

(58) Field of Classification Search
USPC .................................. 269/158, 216, 217, 234
See application file for complete search history.

(56) References Cited

U.S. PATENT DOCUMENTS

| | | | |
|---|---|---|---|
| 4,825,717 A | 5/1989 | Mills | |
| 4,874,156 A * | 10/1989 | Goldzweig | B25B 1/16 269/158 |
| 5,735,128 A | 4/1998 | Zhang et al. | |
| 6,039,312 A * | 3/2000 | Morghen | B23Q 3/18 269/100 |
| 6,109,602 A * | 8/2000 | Schron, Jr. | B25B 5/06 269/20 |

FOREIGN PATENT DOCUMENTS

| | | |
|---|---|---|
| EP | 1442833 A1 | 8/2004 |
| FR | 2767731 A1 | 3/1999 |

OTHER PUBLICATIONS

International Search Report; PCT/FR2011/000624; Nov. 29, 2011.

* cited by examiner

*Primary Examiner* — Lee D Wilson
*Assistant Examiner* — Shantese McDonald
(74) *Attorney, Agent, or Firm* — Studebaker & Brackett PC

(57) ABSTRACT

The invention relates to a clamping/releasing flange that can be used to hold a plate panel on a machining stage, comprising a supporting body (1), a frame (2) that is position-adjustable in relation to the supporting body (1) in the clamping/releasing direction (SD), and a plurality of lugs ($P_1$, $P_2$) used for clamping and holding by being pressed into one of the lateral edges of the panel. The flange comprises, in a housing (20) formed in the frame (2), a mobile support (21) for supporting said clamping and holding lugs ($P_1$, $P_2$) at least partially emerging through a through-hole (22) of the frame, that ends in said housing (20), and means (3) for the continuous control of the movement, clamping, holding and release of the lugs in the clamping direction (SD). The invention is applicable to machine-tool equipment.

9 Claims, 2 Drawing Sheets

Cut A-A

Cut E-E

CLAMPING/RELEASING FLANGE

This is a national stage of PCT/FR11/000624 filed Nov. 29, 2011 and published in French, which has a priority of French no. 1004768 filed Dec. 7, 2010, hereby incorporated by reference.

The invention relates to a clamping/releasing flange that can also be used to hold a plate panel on a machining plate.

Plate panels, in particular metallic plates, are usually firmly mounted on a machine tool plate in order to be machine-treated.

The commonest mounting systems comprise at least one supporting body, a frame which is position-adjustable in relation to this supporting body in the clamping/releasing direction and one or more lugs used for clamping and holding by being pressed into one of the lateral edges forming the side of the panel.

The one or more lugs are made of a special steel, which is very hard, in order to permit the lugs to be pressed down sufficiently into the softer material of the lateral edge of the plate.

This method of clamping/releasing and holding is satisfactory insofar as it makes it possible, in practice, to free the whole of the surface of the plate to be machined, with the aim of applying any machining treatment whatsoever to this latter.

For a more detailed description of this type of mounting, it would be useful to refer to patent application EP 1 442 833, published on Apr. 8, 2004.

Said type of mounting, however, has the disadvantage of necessitating the application of a shock onto each of the clamping/releasing lugs, using a specific tool, such as a mallet or other tool.

In practice, a working method of this type involves the successive application of a discrete shock onto each of the clamping/releasing lugs, which consequently results in a different pressing-down of each clamping/releasing lug into the lateral edge of the plate, and this different pressing-down is liable to have an adverse effect on the stability of the mounting as a whole.

In addition, such a mounting system necessitates the use of both fixed and mobile mounting systems, which require, in the first place, a simple positioning of the plate in contact with the fixed mounting systems, the installation of the mobile mounting systems and the pressing in of the clamping/releasing lugs of these latter, then, lastly, the pressing in of the clamping/releasing lugs of the fixed mounting systems.

Finally, the placing, clamping and holding of a plate for machining by means of said fixed and mobile mounting systems necessitates no less than nine successive elementary operations, not taking into account the number of fixed or mobile mounting systems utilised and the number of clamping/releasing lugs to be pressed in. Consequently, such a working method may lead to uncertainty about the positioning and holding of the plate which is approximately equal to the sum of the uncertainties of positioning of each of the elementary operations.

In addition, and because of the large number of said elementary operations, such a working method appears to be time-consuming and little suited to the automation of the overall process of clamping/releasing and holding on an automatic machining line.

The aim of this invention is to remedy all the disadvantages of the mounting systems of prior art by implementing a clamping/releasing flange that can be used to hold a plate panel for machining, with more or less continuous control of the clamping, holding and releasing of the clamping lugs.

More especially, another aim of this invention is the implementation, on the basis of said more or less continuous control, of the concomitant application of a uniform clamping/releasing force on at least two clamping/releasing lugs equipping the clamping/releasing flange which is the subject matter of the invention, improving the precision of positioning of the plate for machining.

Another aim of this invention is also the implementation, on the basis of the uniform and concomitant nature of the clamping/releasing force applied to the at least two clamping/releasing lugs, of a clamping/releasing flange with multiple clamping/releasing lugs aligned according to a line or a pattern of clamping which could be realised over almost the entire dimension of one lateral edge of the plate, and so adapted to the dimensions of the latter, in order to enable a noticeable improvement in the precision of the positioning and holding of the plate on a machining line.

Another aim of this invention is also, on the basis of the implementation of the more or less continuous control of the clamping, holding and releasing of the clamping lugs, to provide a clamping/releasing and holding flange which is particularly suited to installation and automatic control on a machining line.

The clamping/releasing flange that can be used to hold a plate panel on a machining plate, which is the subject matter of the invention, comprises at least one supporting body, a frame that is position-adjustable in relation to the supporting body in the clamping/releasing direction, and at least two lugs for clamping and holding by being pressed into one of the lateral edges of this panel.

It is notable in that it comprises at least one housing arranged in said frame and, placed in this housing, a mobile support of this at least one clamping and holding lug, at least partially emerging through a through-hole of this frame, ending in this housing and means of continuous control of the movement, clamping, holding and releasing of this at least one lug in the clamping direction.

The clamping/releasing flange in accordance with the invention is also notable in that the mobile support constitutes a tool yoke executing the transmission of the continuous control of the movement of said at least two lugs into a movement of translation of said at least two lugs in the clamping/releasing direction.

The clamping/releasing flange in accordance with the invention is also notable in that said means of continuous control of movement comprise at least one cam means comprising a profiled driving surface forming a pusher cam and driven in continuous rotation about an axis of rotation orthogonal to the clamping/releasing direction and an engagement roller providing the mechanical sliding connection between the profiled driving surface of the camming means and the tool yoke.

The clamping/releasing flange in accordance with the invention is also notable in that the means of continuous control also comprise a return tab of the mobile support and of the tool yoke, integral with the tool yoke and the cam means by means of a pin and a return pin respectively.

The clamping/releasing flange in accordance with the invention is also notable in that the return pin is integral with the return tab and engaged in a groove forming a return cam arranged in the cam means, the return cam being complementary to the profiled driving surface forming a pusher cam of the cam means.

The clamping/releasing flange in accordance with the invention is also notable in that the assembly formed by the mobile support of said at least two clamping lugs and by the means of continuous control of the clamping/releasing forms a ¼ turn or ½ turn control.

The clamping/releasing flange in accordance with the invention is also notable in that the mobile support comprises a plurality of clamping lugs distributed symmetrically on the mobile support in relation to the longitudinal plane of symmetry of the frame and of the mobile support.

The clamping/releasing flange in accordance with the invention is also notable in that the mechanical connection between each clamping lug and the mobile support or tool yoke includes at least one push rod insertable in a calibrated housing arranged in the active face of the tool yoke or mobile support, said push rod comprising a mounting boss at its free end emerging from a calibrated housing and an active clamping lug presenting a lug body of a diameter adapted to the through-hole in the frame in which this active clamping lug is engaged, the non-emerging end of the active clamping lug being in mechanical connection with said mounting boss of the push rod.

The clamping/releasing and holding flange which is the subject matter of the invention can be used in the metalworking industry, for machining and/or the surface treatment of plate panels, metallic or other, of any type.

The clamping/releasing and holding flange which is the subject matter of the invention will be better understood on reading the description and viewing the drawings below, in which the same references designate the same elements and in which.

Figure 1:
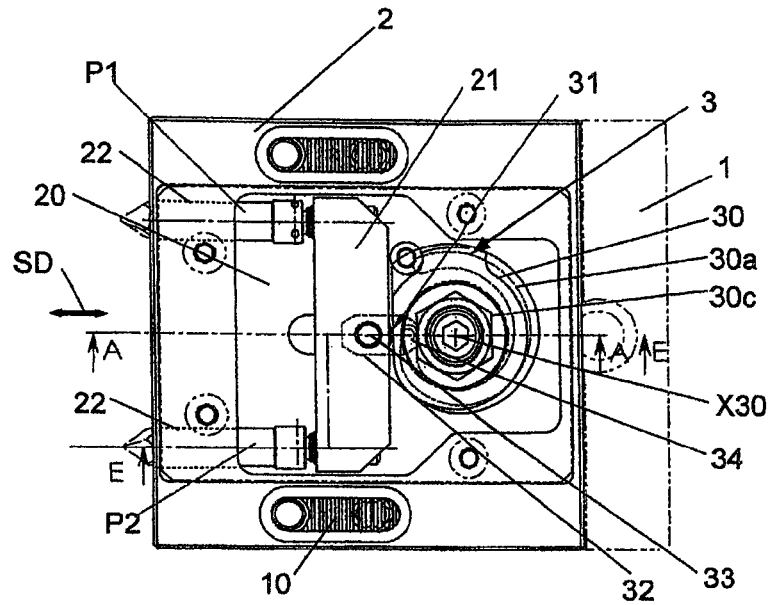
FIG. 1 represents, by way of illustration, a top view of a clamping/releasing flange embodying the invention, in which the cover has been removed.
Figure 4:
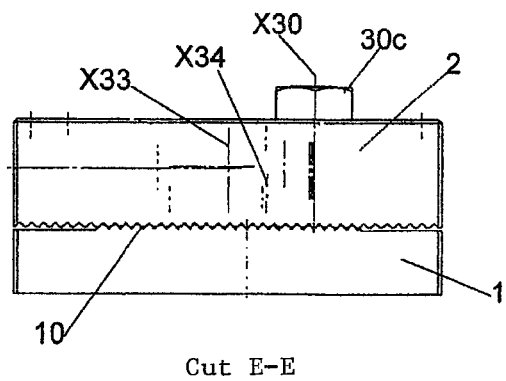
Figure 5:
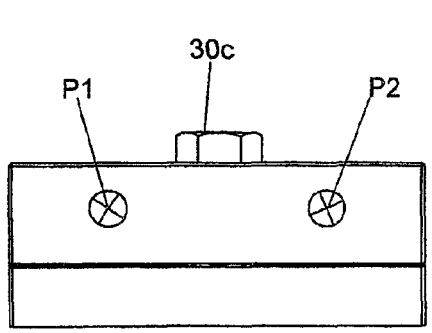
Figure 6:
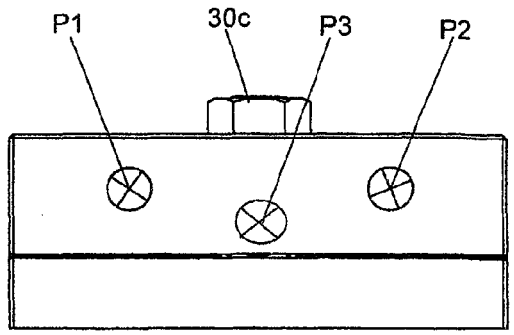

FIG. 4 represents, by way of illustration, a cutaway view according to the cutting line EE from FIG. 1, for the purpose of showing the position and the relative arrangement of the axes of axial symmetry of the elements designated as cam, pin and return pin, enabling the formation of the mechanical connection between the cam means and the tool yoke, which carries the clamping/releasing lugs that can be used for holding the flange which is the subject matter of the invention;

FIGS. 5 and 6 represent advantageous, non-limitative variant embodiments of the clamping/releasing and holding flange which is the subject matter of the invention according to a view from the left of this latter, as represented in FIG. 1.

In reference to FIG. 1, the clamping/releasing flange that can be used for holding a plate panel on a machining plate, in accordance with the object of this invention, comprises, as represented in said figure, a supporting body 1 and a frame 2, that is position-adjustable in relation to the supporting body 1 in the clamping/releasing direction represented by the double arrow SD in said figure. In this figure, the supporting body 1 represented by dot-and-dash lines extends beneath the frame 2 and appears in two position-adjustment slots of the frame 2 in relation to the supporting body 1.

Also, the clamping/releasing flange which is the subject matter of the invention comprises at least one clamping and holding lug, marked P1 and P2 and limited to two in the representation in FIG. 1 in non-limitative fashion. Said clamping lugs make it possible to ensure the clamping and the holding of the plate panel by pressing into one of the lateral edges of this latter.

According to one notable aspect of the clamping/releasing flange that can be used for holding a plate panel which is the subject matter of the invention, this flange also comprises, as represented in said FIG. 1, a housing 20 arranged in the frame 2. A mobile support 21 for the clamping and holding lugs P1 and P2 is placed in said housing. These clamping and holding lugs each emerge at least partially through a through-hole 22 arranged in the frame 2 and ending in said housing 20. By observing FIG. 1, it will be understood that, for preference, a through-hole 22 is provided for each clamping and holding lug P1 and P2 equipping the clamping/releasing and holding flange which is the subject matter of the invention. Each through-hole 22 may, for preference, serve as guide for each clamping/releasing lug during the movement in translation according to the direction of movement SD, as will be described in more detail later on in the description.

Finally, as will be observed in FIG. 1, the housing 20 also comprises means 3 of continuous control of the movement, clamping, holding and releasing of the clamping/releasing and holding lugs P1 and P2 in said clamping/releasing direction SD.

With respect to the manufacture of the supporting body 1 and of the frame 2, these are preferably made from material by moulding of a ferrous, non-ferrous or other alloy, or machined by skiving.

As will also be observed in FIG. 1, the mobile support 21 constitutes a tool yoke executing the transmission of the continuous control of the movement of the clamping and holding lugs P1 and P2 according to a movement of translation of these latter in said clamping/releasing direction SD. The notion of tool yoke covers any element of mobile support which provides for the simultaneous translation and the application of a more or less identical instantaneous force on each of the clamping/releasing lugs in the clamping/releasing direction SD.

More specifically, as is also apparent from FIG. 1, the means 3 of continuous control of the movement comprise at least one cam 30 comprising a profiled driving surface 30a and forming a pusher cam. Said pusher cam is driven in continuous rotation about an axis of rotation, marked X30, this axis of rotation being orthogonal to the clamping/releasing direction SD, and, in particular, orthogonal to the plane of the sheet containing FIG. 1. The means 3 of continuous control of movement also comprise an engagement roller 31 providing the mechanical sliding connection between the profiled driving surface 30a of the cam 30 and the tool yoke 21.

Likewise, the means 3 of continuous control also comprise a return tab 32 of the mobile support and of the tool yoke 21, this return tab being integral with the tool yoke 21 and the cam 30 by means of a pin 33 and a return pin 34.

Figure 3:
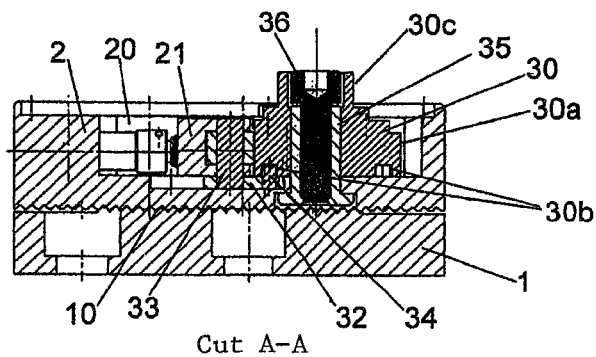
FIG. 3 represents, by way of illustration, a cutaway view of the clamping/releasing and holding flange represented in FIG. 1, according to the cutting plane A-A, longitudinal plane of symmetry of the latter.

As will be observed in particular in FIG. 1 and in FIG. 3, the return pin 34 is integral with the return tab 32 and engaged in a groove forming a return cam 30b, arranged in the cam 30. Of course, the topography of the return cam 30b is complementary to the profiled driving surface forming the pusher cam 30a of the cam 30. The complementary nature of the return cam 30b with respect to the profiled driving surface forming the pusher cam 30a means the kinematic complementarity of the profiled driving surface forming said pusher cam 30a, in order to assure the return in the opposite direction of the tool yoke 21 and of the clamping/releasing and holding lugs P1 and P2 in the clamping/releasing direction SD.

Figure 2:
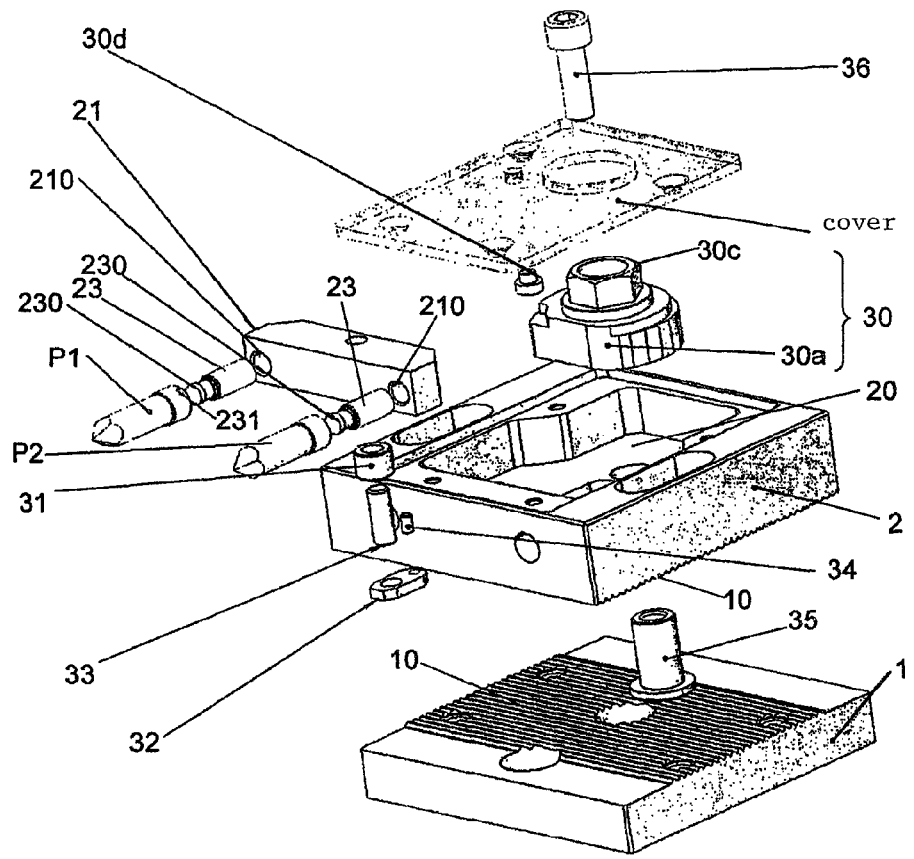
FIG. 2 represents, by way of illustration, an exploded perspective view of a clamping/releasing flange embodying the invention, for the purpose of showing all of the essential elements constituting this latter.

A more detailed description of the assembly of the clamping/releasing flange which is the subject matter of the invention is now given in reference to the exploded perspective view of this latter, as illustrated in FIG. 2.

In FIG. 2, it will be noted that the supporting body 1 and the frame 2 that is position-adjustable in the clamping/releasing direction SD are mechanically connected by an adjustable connecting rack 10. Said connecting rack consists of rectilinear grooves arranged on the opposing faces of the supporting body 1 and of the frame 2 and orthogonal to the longitudinal plane of symmetry, plane A-A of FIG. 1, and in consequence to said clamping/releasing direction. The position-adjustable frame 2 can thus be adjusted in relation to the edge of the plate panel, the assembly being mounted on the plate of the machine tool. In consequence, the clamping/releasing lugs in retracted position are also placed as a function of the nature of the material of the plate panel, of the mechanical characteristics of this latter and of the planned depth of insertion of the clamping/releasing lugs.

Also, as can be observed in FIG. 2, the cam 30 is mounted in the housing 20 by means of a sleeve 35, the assembly being fixed to the lower wall of the frame 2 by means of a machine bolt 36. The cam 30 is thus mounted in rotation about the sleeve 35. The tip of the cam 30 is fitted with a bolt head 30c designed to allow control of the continuous rotation of the cam 30, either manually, using an Allen key, or by means of an automatic control tool integrated into the machine tool, for example. A stop stud 30d makes it possible, if necessary, to limit and adapt the course of the cam 30 and finally of the tool yoke 21 and of the clamping/releasing and holding lugs P1 and P2, as a function of the type of plate panel installed on the machine-tool.

The guide roller 31 providing for the contact between the profiled surface 30a and the tool yoke 21 is made from a non-abrasive material, such as a bronze-beryllium alloy, for example. The same applies to the return pin 34, which is engaged in the groove 30b arranged on the lower surface of the cam 30 opposite the rack 10, in order to provide a driving return without significant friction of the assembly consisting of the return pin 34, the return tab 32, the pin 33 and finally the tool yoke 21 and the clamping/releasing and holding lugs P1 and P2.

An arrangement of said assembly and of the cam 30 including the pusher cam formed by the profiled surface 30a and by the groove 30b, the cam 30 being mounted by means of the sleeve 35 and the bolt head 36, is shown in detail in FIG. 3 in the cutting plane A-A of FIG. 1.

The positions of the axes of rotation of the cam 30, of the pin 33 and of the return pin 34, axes marked X30, X33 and X34 in FIG. 3, are represented in FIG. 4.

Finally, as shown in particular in FIG. 2, the mechanical connection between each clamping/releasing and holding lug P1, P2 and the mobile support or tool yoke 21 advantageously includes a push rod 23 insertable into a calibrated housing 210, arranged in the active face of the tool yoke or mobile support 21, bearing the clamping/releasing and holding lugs. Each push rod 23 includes a mounting boss 230 at its free end emerging from a calibrated housing 210.

As will also be observed in FIG. 2, each actual or active clamping lug advantageously has a lug body of a diameter adapted to the through-hole 22 of the frame 2 in which this active clamping lug active is engaged. The non-emerging end of said active clamping lug is fixed mechanically to the mounting boss 230 of the push rod 23. The mounting may be effected by means of a housing and set screws 231.

On observing FIGS. 1, 2 and 3, it will be understood that the assembly formed by the mobile support 21 of the clamping lugs P1, P2 and by the means of continuous control 3 of the clamping/releasing, i.e. the cam 30 including the pusher cam and the return cam, forms a ¼ turn or ½ turn control.

The number of clamping/releasing lugs fitted to the tool yoke 21 is not limited to 2, as illustrated in non-limitative fashion in FIGS. 1 to 5. In particular, in one advantageous non-limitative embodiment, the dimensions of the clamping/releasing and holding flange which is the subject matter of the invention may be adapted in terms of width, width being defined as the dimension, in the direction orthogonal to the direction of clamping/releasing SD, of the grooves constituting the rack 10. This adaptation may, for example, be effected by a set of different clamping/releasing and holding flanges of different dimensions, as a function of the dimensions of the plate panel to be held on the plate of the machine-tool.

In the same way, the clamping/releasing flange which is the subject matter of the invention may, as represented in FIG. 6, be adapted in terms of height, i.e. in a dimension parallel to the axes of rotation X30, X33 and X34, as a function of the actual thickness of the plate panel to be fixed to the plate of the machine-tool. In this situation, as represented in FIG. 6, the clamping/releasing lugs may advantageously be distributed on the mobile support 21 in symmetrical manner in relation to the longitudinal plane of symmetry, cutting plane A-A in FIG. 1, of the frame 2 and of the mobile support 21. As illustrated in said figure, the clamping/releasing lugs P1, P2 and P3 may advantageously be distributed according to a pattern extending in accordance with the height of the clamping/releasing and holding flange which is the subject matter of the invention, in order to provide improved holding of a plate panel of greater thickness.

The invention claimed is:

1. A clamping/releasing flange that can be used to hold a plate panel on a machining plate, said flange having at least one supporting body (1), a frame (2) being positioned in relation to the supporting body (1) in the clamping/releasing direction and at least two clamping and holding lugs (P1, P2) by being pressed into one of the lateral edges of this panel, characterised in that said flange has at least:
   one housing (20) arranged in said frame (2); and, placed in said housing,
   one mobile support (21) of said at least two clamping and holding lugs (P1, P2), at least partially emerging through a through-hole (22) of said frame (2) ending in said housing (20), said mobile support (21) constituting a tool yoke executing the transformation of the continuous control of movement of said at least two lugs (P1, P2) into a movement of simultaneous translation of said at least two lugs in the clamping/releasing direction;
   means of continuous control (3) of the movement, of the clamping, of the holding and of the releasing of said at least two lugs in the direction of clamping.

2. A clamping/releasing flange according to claim 1, characterised in that said means of continuous control (3) of the movement comprise at least:
   one cam (30) having a profiled driving surface (30a) forming a pusher cam and driven in continuous rotation about an axis of rotation (X30) orthogonal to the clamping/releasing direction;
   one engagement roller (31) proving the mechanical sliding connection between the profiled driving surface (30a) of the cam (30) and the tool yoke (21).

3. A clamping/releasing flange according to claim 1, characterised in that said means of continuous control (3) also have a return tab (32) of the mobile support and of the tool yoke (21), integral with the tool yoke (21) and with the cam (30) by means of a pin (33) and a return pin (34) respectively.

4. A clamping/releasing flange according to claim 3, characterised in that the return pin (34) is integral with the return tab (32) and engaged in a groove forming a return cam (30b) arranged in said cam (30), said return cam (30b) being complementary to the profiled driving surface forming the pusher cam (30a) of the cam (30).

5. A clamping/releasing flange according to claim 1, characterised in that the assembly formed by the mobile support of said at least two clamping lugs (P1, P2) and by the means of continuous control (3) of the clamping/releasing forms a ¼ turn or ½ turn control.

6. A clamping/releasing flange according to claim 1, characterised in that said mobile support comprises a plurality of clamping lugs distributed symmetrically on the mobile support in relation to the longitudinal plane of symmetry of the frame (2) and of the mobile support (21).

7. A clamping/releasing flange according to claim 1, characterised in that the supporting body (1) and the frame (2) are position-adjustable in relation to each other.

8. A clamping/releasing flange according to claim 7, characterised in that the position-adjustable supporting body (1) and frame (2) are mechanically connected by an adjustable connecting rack, the grooves of the rack being orthogonal to the longitudinal plane of symmetry of the frame and of the supporting body and to the clamping/releasing direction.

9. A clamping/releasing flange according to claim 1, characterised in that the mechanical connection between each clamping lug (P1, P2) and the mobile support or tool yoke (21) includes at least:
- one push rod (23) insertable in a calibrated housing (210) arranged in the active face of the tool yoke or mobile support (21), said push rod (23) having a mounting boss (230) at its free end emerging from a calibrated housing (210);
- one active clamping lug having a lug body of a diameter adapted to the through-hole (22) of the frame (2) in which this active clamping lug is engaged, the non-emerging end of the active clamping lug being in mechanical connection with said mounting boss (230) of the push rod (23).

\* \* \* \* \*